(12) United States Patent
Taniguchi et al.

(10) Patent No.: US 6,309,734 B1
(45) Date of Patent: Oct. 30, 2001

(54) IMAGE TRANSFER SHEET AND IMAGE FORMING METHOD USING THE IMAGE TRANSFER SHEET

(75) Inventors: Keishi Taniguchi, Susono; Shigeo Hatada, Numazu, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/440,270

(22) Filed: Nov. 15, 1999

(30) Foreign Application Priority Data

Nov. 13, 1998 (JP) .................................................. 10-323205

(51) Int. Cl.⁷ .............................. B32B 3/00; B41M 3/12; B41M 5/20
(52) U.S. Cl. ........................ 428/195; 427/149; 427/195; 427/152; 503/227; 430/126
(58) Field of Search ..................................... 427/152, 149, 427/195; 428/914, 195; 503/227; 430/126

(56) References Cited

U.S. PATENT DOCUMENTS

| | | | |
|---|---|---|---|
| 5,658,850 | * | 8/1997 | Taniguchi et al. .................... 503/227 |
| 6,040,268 | * | 3/2000 | Ueno et al. ........................... 503/227 |
| 6,042,881 | * | 3/2000 | Ewan .................................... 427/152 |
| 6,042,984 | * | 3/2000 | Taniguchi ............................. 430/126 |

* cited by examiner

Primary Examiner—Cynthia H. Kelly
Assistant Examiner—Kim Nguyen
(74) Attorney, Agent, or Firm—Oblon, Spivak, McClelland, Maier & Neustadt, P.C.

(57) ABSTRACT

An image transfer sheet which includes a water-permeable supporter, a release layer which is formed overlying the water-permeable supporter and which includes a water-soluble resin, and an image bearing layer which is formed overlying the release layer and includes a resin and on which an image is to be born, wherein a ratio $L_2/L_1$ is not less than 0.99, where $L_1$ represents a length of one side of the image bearing layer when measured before the image transfer sheet is dipped into water, and $L_2$ represents a length of the side of the image bearing layer when measured by setting the image bearing layer on an acrylic plate after the image transfer sheet is dipped into water and the image bearing layer is released from the water-permeable supporter.

15 Claims, 2 Drawing Sheets

IMAGE TRANSFER SHEET AND IMAGE FORMING METHOD USING THE IMAGE TRANSFER SHEET

BACKGROUND OF THE INVENTION

1. Field of the Invention

The present invention relates to an image transfer sheet which transfers an image formed thereon onto a receiving material and an image transfer method using the image transfer sheet.

2. Discussion of the Background

Recently, a variety of image forming apparatus have been developed and utilized for copiers and printers for computers or the like. These image forming apparatus include, for example, electrophotographic copiers in which a toner image formed on an image bearing member is transferred onto a receiving material, and printers in which an ink image is formed on a receiving material by imagewise heating a thermal transfer recording material or a sublimation thermal transfer recording material or by imagewise shooting an aqueous ink or an ink fused by heat. The images formed with these image forming apparatus are not only used for a purpose of reading or viewing, but also tried to be applied for various new applications.

As one of these new applications of the images, a method is proposed in which the images are transferred onto an image receiving material, such as cloth, leather, canvas, plastics, paper, wood, glass, china, metals or the like. This method is useful for manufacturing a small lot of made-to-order goods having original pictures thereon, such as T-shirts, sweat shirts, aprons, jackets, cups, plates or stained glass, and for manufacturing small lot of pictures duplicated on canvases, which are mainly manufactured for individuals. Currently, since full color copiers are developed and high quality full color images can easily be obtained, the demand for this method is increasing more and more.

An image transfer sheet used for the image forming method in which toner images formed on the image transfer sheet are transferred onto such an above-mentioned image receiving material is discussed, for example, in Japanese Laid-Open Patent Publication No. 52-82509. This Publication discloses an image transfer sheet including an adhesive layer, which is formed on a supporter and which includes an adhesive selected from the group consisting of silicones and fluorine-containing polymers, and an under coat layer, which is formed on the adhesive layer and which is consisting of a polymer meltable at a relatively low temperature. When a toner image, which is formed on the undercoat layer of the image transfer sheet, is brought into contact with a receiving material such as cloth etc. While being heated and pressed, the toner image is transferred onto the receiving material together with the undercoat layer.

In the present application, this method in which an image is transferred on a receiving material upon application of heat and pressure is hereinafter referred to as a dry-type image transfer method.

Another image transfer sheet is disclosed in, for example, Japanese Laid-Open Patent Publication No. 8-108610. This Publication discloses an image transfer sheet in which a release layer including a water-soluble resin as a main component, an adhesive layer which can adhere to a receiving material, an image bearing layer on which an image is to be formed, are overlaid on a substrate permeable to water (hereinafter referred to as a water-permeable substrate) in this order. After an image is formed on the image bearing layer of the image transfer sheet, the transfer sheet is dipped into water to dissolve the release layer, and thereby a combination layer of the image bearing layer/adhesive layer can be released from the substrate. The combination layer of the image bearing layer/adhesive layer, which has been released from the substrate while sliding on the surface of the substrata, is then adhered to a receiving material such as glass, plastics etc., and dried to form a transfer image on the receiving material.

In the present application, this method in which an image formed on a transfer sheet is transferred on a receiving material including a step of dipping the transfer sheet into water is hereinafter referred to as a wet-type image transfer method.

The wet transfer method is superior to the dry transfer method because the wet transfer method does not need an additional apparatus for heating end pressing a transfer street, and an image can tee easily transferred onto a receiving material which deforms or breaks upon application of heat and pressure. In addition, the wet-type image transfer method has en advantage in that an image can be easily transferred onto a receiving material having a curved surface.

However, the transfer sheet for use in wet-type image transfer methods disclosed in Japanese Laid-Open Patent Publication No. 8-108610 has the following drawback. When an image formed on the combination layer of the image bearing layer/adhesive layer, which has been released from the substrate in water, is transferred onto a receiving layer, the image tends to be wrinkled particularly when the image is made of a toner formed by electrophotography and an ink formed by a thermal transfer method.

Because of these reasons, a need exists for an image transfer street which is used for wet-type image transfer methods and which can form a transferred image having good image qualify on a variety of receiving materials without making wrinkles, and an image forming method using the image transfer sheet.

SUMMARY OF THE INVENTION

Accordingly, an object of the present invention is to provide an image transfer street which is used for wet-type image transfer methods and which can form a transferred image having good image quality on a variety of receiving materials without making wrinkles.

Another object of the present invention is to provide a wet-type image transfer method which can form a transferred image having good image quality on a variety of receiving materials without making wrinkles.

Briefly these objects and other objects of the present invention as hereinafter will become more readily apparent can be attained by an image transfer sheet useful for wet-type image transfer methods in which a release layer including a water-soluble resin as a main component, and an image bearing layer including a resin is overlaid on a water-permeable supporter in this order, wherein an image, which is formed on the image bearing layer, is transferred onto a receiving material after releasing the image bearing layer having the image from the water-permeable supporter in water, and wherein a ratio L2/L1 is not less than 0.99, where L1 represents a length of one side of the image bearing layer when measured before the image transfer sheet is dipped into water, and L2 represents a length of the side of the image bearing layer when measured by setting the image bearing layer on a wet acrylic plate after the image transfer sheet is dipped into water and the image bearing layer is released from the water-permeable supporter.

In the image transfer sheet mentioned above, an adhesive layer and an image supporting layer are optionally formed between the release layer and the image bearing layer. In this case, a combination layer of the image bearing layer having an image with the image supporting layer and/or the adhesive layer is adhered to a receiving material after being released from the substrate in water.

The resin included in the image bearing layer preferably has a transition temperature not lower than 30° C., and the thickness of the image bearing layer is preferably from 5 to 50 μm.

In another aspect on the present invention, a wet-type image transfer method is provided which includes the steps of transferring an image formed of a toner, an ink or the like on the image bearing layer of the image transfer sheet mentioned above, releasing the image bearing layer having the image from the substrate, adhering the image bearing layer on a receiving material, and then drying the image bearing layer, to form the image on the receiving material.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The present inventors studied how wrinkles are formed in the image bearing layer of a wet-type image transfer sheet when the image bearing layer is released from the image transfer sheet in water. As a result of the study, it is found that if the image bearing layer shrinks such that L2/L1 is less than 0.99 when the image bearing layer is released in wafer, wrinkles occur in the resultant transferred image. In contrast, if the image bearing layer shrinks such that L2/L1 is not less than 0.99 when released in water, wrinkles are not observed in the resultant transferred image.

Figure 1:
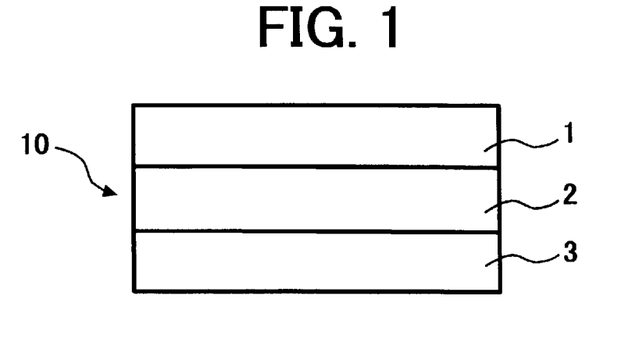
FIG. 1 is a schematic view illustrating the structure of an embodiment of the image transfer sheet of the present invention.
Figure 2:
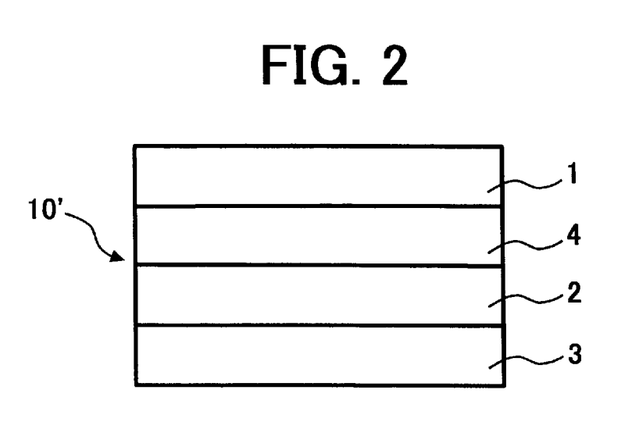
FIG. 2 is a schematic view illustrating the structure of another embodiment of the image transfer sheet of the present invention.
Figure 3:
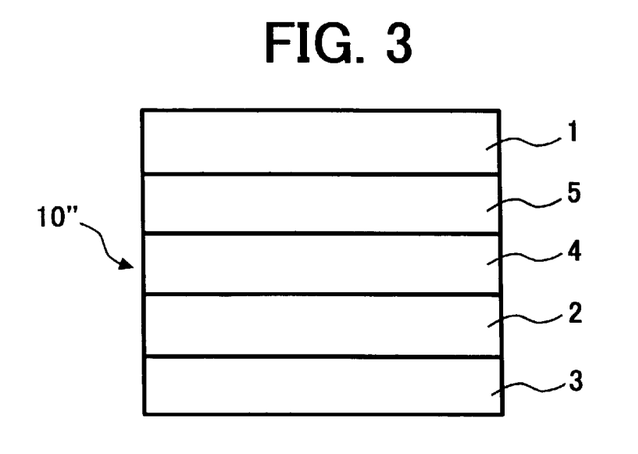
FIG. 3 is a schematic view illustrating the structure of yet another embodiment of the image transfer sheet of the present invention.

The structures of embodiments of the image transfer street of the present invention are illustrated in FIGS. 1 to 3.

In FIG. 1, an image transfer sheet 10 has a structure in which a release layer 2 and an image bearing layer 1 are overlaid on a water-permeable supporter 3 in this order.

In FIG. 2, an image transfer sheet 10' has a structure in which a release layer 2, an adhesive layer 4, and an image bearing layer 1 are overlaid on a water-permeable supporter 3 in this order.

In FIG. 3, an image transfer sheet 10" has a structure in which a release layer 2, an adhesive layer 4, an image supporting layer 5, and an image bearing layer 1 are overlaid on a water-permeable supporter 3 in this order.

The structure of the image transfer sheet of the present invention is not limited thereto.

Figure 4A:
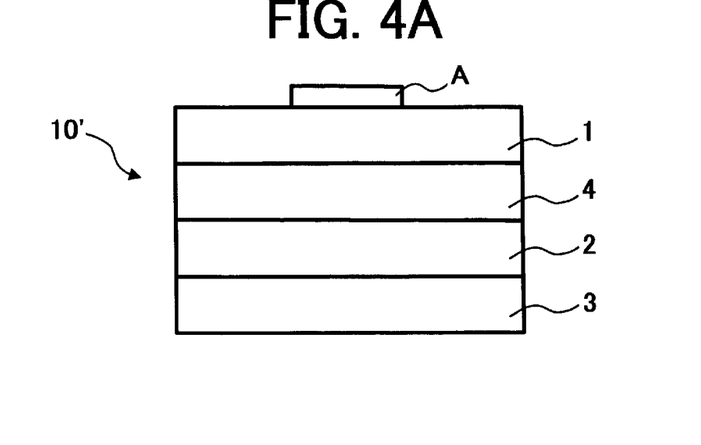
FIGS. 4A–4C are schematic views illustrating how an image formed on the image transfer sheet of the present invention is transferred onto a receiving material by a wet-type transfer method.
Figure 4B:
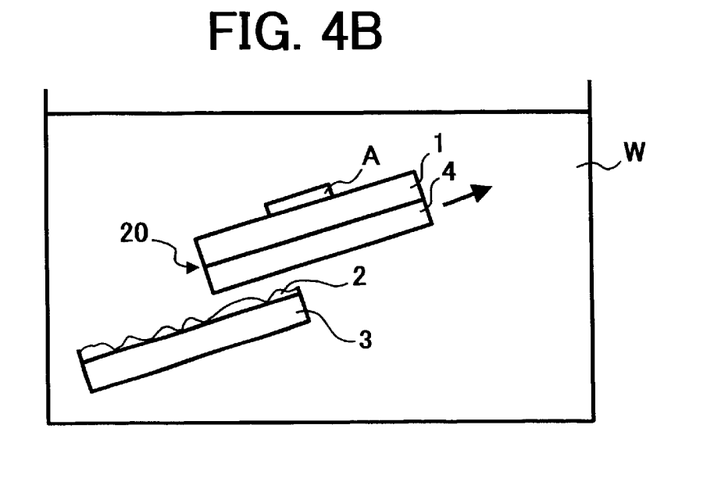
Figure 4C:
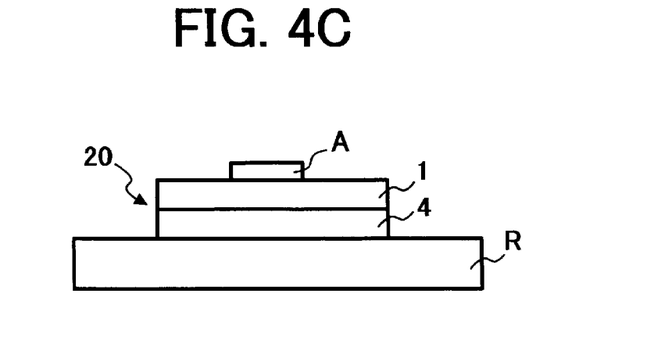

FIG. 4A is a schematic view illustrating an image transfer sheet in which an image A is transferred on the image bearing layer 1 of the image transfer sheet 10'. The image transfer sheet 10' on which the image A is born is then dipped in water, and a combination layer 20 of the image bearing layer 1 having the image A with the adhesive layer 4 is released from the water-permeable supporter 3 as shown in FIG. 4B. The combination layer 20 is then adhered to a receiving material R as shown in FIG. 4C. Thus the image A is transferred onto the receiving material R.

According to the present invention, the image transfer sheet 10, 10' or 10" is provided in which an image bearing layer 1 including a resin is formed on a release layer 2 formed on a water-permeable supporter 3 with optionally an image supporting layer 5 end an adhesive layer 4 therebetween, wherein an image A, which is formed on the image bearing layer 1, is transferred onto a receiving material R after releasing the image bearing layer 1 having the image from the water-permeable supporter 3 in water, and wherein a ratio L2/L1 is not less than 0.99, where L1 represents a length of one side of the image bearing layer 1 when measured before dipping the image transfer sheet into water, and L2 represents a length of the side of the image bearing layer 1 when measured by setting the image bearing layer on a wet acrylic plate after being released from the water-permeable supporter 3.

When the image transfer sheet 10 has such a property as mentioned above, the image on the image bearing layer 1 can be transferred onto a receiving material R without making wrinkles in the resultant transferred image. In order to obtain such an image transfer sheet having good dimensional stability can be obtained by using a specified resin in the image bearing layer 1, and in both the image bearing layer 1 and the image supporting layer 5 when the image supporting layer 5 is formed.

When a resin having a glass transition temperature not lower than 30° C. is used in the image bearing layer 1 and the image supporting layer 5, the resultant image transfer sheet 10, 10' or 10" has good dimensional stability (L2/L1>0.99) and an image A having good image qualities can be completely transferred onto the receiving material R without wrinkles. In the present invention, the glass transition temperature (Tg) of a resin is measured by a differential thermal analysis method.

Next, the resin for use in the image bearing layer 1 and the image supporting layer 5 will be explain in detail.

Suitable resins for use in the image bearing layer 1 and the image supporting layer 5 include polyurethane resins, polyamide resins, polyester resins, polyolefin resins, polystyrene resins, acrylic resins, vinyl resins, ionomer resins, epoxy resins, phenolic resins, polycarbonate resins, polyacetal resins, cellulose resins, melamine resins, fluorine-containing resins, silicone resins, polyether resins, copolymers of these resins and crosslinked resins of these resins.

Polyurethane resins for use in the image bearing layer 1 and the image supporting layer 5 of the present invention include thermoplastic polyurethane resins which are prepared by reacting an isocyanate compound with a polyol compound having a hydroxy group at an end of the molecule.

Specific examples of the isocyanate compounds include aromatic diisocyanate compounds such as tolylene diisocyanate, and diphenylmethane-4,4'-diisocyanate; alicyclic diisocyanate compounds such as isophorone diisocyanate; aliphatic diisocyanate compounds such as trimethylene diisocyanate, tetramethylene diisocyanate, hexamethylene diisocyanate, and dodecamethylene diisocyanate. These isocyanate compounds are used alone or in combination.

Specific examples of the polyol compounds include polyhydroxy compounds such as alkane polyols, polyester polyols, and polyether polyols. These polyol compounds are used alone or in combination.

Specific examples of the alkane polyol compounds include alkane diols such as 1,5-pentanediol, 1,8-octanediol, 1,10-decanediol, and 1,12-dodecanediol.

Specific examples of the polyester polyol compounds include aliphatic polyester diols which include as a constituent one of aliphatic diols and aliphatic dicarboxylic acids, which are mentioned below.

Specific examples of polyether polyol compounds include diethylene glycol, triethylene glycol, polyethylene glycol, tripropylene glycol, polypropylene glycol, and polyether diols such as adducts of bisphenol A with an alkylene oxide such as ethylene oxide.

Specific examples of the polyamide resins for use in the image bearing layer and image supporting layer include nylon 6, nylon 11, nylon 12, nylon 13, nylon 610, nylon 612, nylon 616, and nylon copolymers prepared by copolymerizing raw materials of these nylons.

Suitable polyester resins for use in the image bearing layer and image supporting layer include polyester resins which include as a constituent at least one of aliphatic diols and aliphatic dicarboxylic acids. In particular, aliphatic polyester resins including as a constituent both an aliphatic diol and an aliphatic dicarboxylic acid are preferable. More preferably, polyester resins including a repeating unit of a saturated dicarboxylic acid are used.

Specific examples of the aliphatic diol compounds include ethylene glycol, diethylene glycol, triethylene glycol, polyethylene glycol, propylene glycol, dipropylene glycol, tripropylene glycol, polypropylene glycol, 1,3-butanediol, 1,4-butanediol, neopentyl glycol, 1,6-hexanediol, and polymethylene glycol.

Specific examples of the aliphatic dicarboxylic acid compounds include unsaturated aliphatic dicarboxylic acids such as maleic acid and fumaric acid; and saturated aliphatic dicarboxylic acids such as succinic anhydride, adipic acid, azelaic acid, sebacic acid, suberic acid, and dodecanedioic acid.

Suitable polyolefin resins for use in the image bearing layer and image supporting layer include polyethylene resins such as low density polyethylene and linear low density polyethylene; ethylene-butane-1 copolymers, ethylene-(4-methylpentene-1) copolymers, ethylene-vinyl acetate copolymers, ethylene-(meth)acrylic acid copolymers, ethylene-(meth)acrylate, propylene-butane-1 copolymers, ethylene-propylene copolymers, ethylene-propylene-butane-1 copolymers, and polyolefins modified with a compound such as maleic anhydride or the like. Among these polyolefins, modified polyolefins are preferable.

Acrylic resins for use in the image bearing layer and image supporting layer include polymers which are prepared by polymerizing one or more of acrylic acid and its derivatives. Namely, polymers and copolymers of acrylic acid, acrylic acid esters, acryl amide, acrylonitrile, methacrylic acid and methacrylic acid esters are included in acrylic resins.

Vinyl resins for use in the image bearing layer and image supporting layer include linear polymers which are prepared by addition-polymerizing one or more vinyl compounds. Specific examples of the vinyl resins include polyvinyl acetate, polyvinyl chloride, and vinyl chloride-vinyl acetate copolymers.

Ionomer resins, which are also known as ionic polymers, include polymers which include a chain which is connected with an inorganic salt group. Specific examples of the ionomer resins include alkali salts of ethylene-methacrylic acid copolymers, alkali salts of butadiene-acrylic acid copolymers, and alkali salts of styrene-acrylic acid copolymers.

Epoxy resins for use in the image bearing layer and image supporting layer include resins having a ring of epoxy, epoxide, oxirane, or ethoxyline. In general, epoxy resins have a linear or ringed aliphatic skeleton, or an aromatic ring skeleton. Epoxy compounds having an epoxy ring easily reacts with a variety of compounds. When treated with a crosslinking agent, the epoxy compounds become thermosetting polymers, which are not soluble in solvents end do not melt upon application of treat.

Phenolic resins for use in the image bearing layer and image supporting layer include thermosetting resins which are prepared by condensation polymerizing a phenolic compound with an aldehyde such as formaldehyde using an acid or an alkali.

Polycarbonate resins for use in the image bearing layer and image supporting layer include linear polymers having a carbonic acid ester bond —O—R—O—CO— in the main chain thereof.

Cellulose resins for use in the image bearing layer and image supporting layer include regenerated cellulose, graft copolymers of cellulose, cellulose esters, cellulose ethers, and other cellulose derivatives. Specific examples of the cellulose resins include ethyl cellulose, cellulose propionate, acetyl butyl cellulose, acetyl cellulose, triacetyl cellulose, cellulose acetate propionate, nitrocellulose, cellophane, rayon, cellulose phosphate, and deoxycellulose.

Melamine resins for use in the image bearing layer and image supporting layer include thermosetting resins which are prepared by condensation polymerizing melamine with formaldehyde.

Fluorine-containing resins for use in the image bearing layer and image supporting layer include thermoplastic resins in which one or more hydrogen atoms of ethylene are substituted with a fluorine atom. Specific examples of the fluorine-containing resins include polytetrafluoroethylene, polytrifluoroethylene, polyvinyl fluoride, polyvinylidene fluoride, polydichlorodifluoroethylene and other like polymers and copolymers.

Silicone resins for use in the image bearing layer and image supporting layer include organopolysiloxanes having a three-dimensional structure.

Polyether resins for use in the image bearing layer and image supporting layer include linear polymers having an ether bond in their main chain, and in general include polymer compounds having a repeating unit —O—M—O—, wherein M represents a methylene group or polymethylene group. Specific examples of the polyether resins include polyoxydecamethylene, polyoxymethylene, polyethyleneoxide, and polymers of 1,3-dioxirane.

Among these resins for use in the image bearing layer and the image supporting layer, acrylic resins are preferable because of having good transparency and durability, and high film strength and gloss.

The image bearing layer and image supporting layer may include additives such as tackifiers, antioxidants, ultraviolet absorbents, colorants, antistatic agents, flame retardants, waxes, plasticizers, fillers and the like.

The thickness of the image bearing layer is from 5 to 50 μm if the image supporting layer is not formed. When the thickness is less than 5 μm, the image formed on the image bearing layer tends to be easily deformed or torn when the image is transferred on a receiving material. In contrast, when the thickness is greater than 50 μm, the transferred image looks unnatural because it looks like a label.

The thickness of the image supporting layer is from 5 to 50 μm. When the thickness is less than 5 μm, the image formed on the image bearing layer tends to be easily deformed or torn when the image is transferred on a receiving material. In contrast, when the thickness is greater than 50 μm, the transferred image looks unnatural because it looks like a label.

When an image bearing layer is formed on an image supporting layer, the thickness of the image bearing layer is preferably from 0.1 to 10 μm.

Suitable materials for use as the water-permeable supporter include materials into which water can rapidly permeate. Specific examples of such materials include paper, synthetic paper, cloth, non-woven cloth, leather, sheets of a resin such as polyethyleneterephthalate, diacetate cellulose, triacetyl cellulose, acrylic polymers, cellophane, celluloid, polyvinyl chloride, polycarbonate, polyimide, polyethersulfone, polyethyl ether ketone, polyethylene, and propylene; metal plates metal foils, and the like. In addition, complex sheet of these materials can also be used. Further, materials which are prepared by subjecting the above-mentioned materials to a water-proof treatment or an electroconductive treatment can also be used. The material of the water-permeable supporter is not limited the materials mentioned above. Among these materials, paper having a basis weight of from 20 to 200 $g/m^2$ is preferable as a water-permeable supporter because of having good feeding properties in image forming apparatus, and good water permeability, and being low-priced.

The release layer of the image transfer sheet of the present invention includes a water-soluble resin as a main component. Suitable water-soluble resins include known water-soluble resins. Specific examples of such water-soluble resins include dextrin, polyvinyl alcohols, gelatin, glue, casein, shellac, starch, protein, polyacrylamide, polyvinyl methyl ether, copolymers of methyl vinyl ether with maleic anhydride, polyvinylpyrrolidone, acetyl cellulose, acetyl butyl cellulose, carboxymethyl cellulose, methyl cellulose, hydroxymethyl cellulose, and sodium alginate.

Among these resins, polyvinyl alcohols are preferable. In particular, polyvinyl alcohols having a saponification degree not greater than 90% and a polymerization degree not greater than 1000 are more preferable, and polyvinyl alcohols modified with itaconic acid which have a saponification degree not greater than 90% and a polymerization degree not greater than 1000 are even more preferable, because the resins can rapidly dissolve in water, and therefore the image bearing layer can be rapidly released from the water-permeable supporter.

The weight of the release layer is preferably from 1 $g/m^2$ to 50 $g/m^2$ on a dry basis. When the weight is less than 1 $g/m^2$, the image bearing layer cannot easily released from the water-permeable supporter because the adhesive layer tends to adhere to the water-permeable supporter. In contrast, when the weight is less than 50 $g/m^2$, a fair amount of the materials in the release layer tends to remain on the adhesive layer, resulting in deterioration of adhesive properties of the adhesive layer.

The release layer may have a plurality of layers, if necessary.

The adhesive layer of the image transfer sheet of the present invention serves as a birding agent of the image bearing layer having an image with a receiving material. The material of the adhesive layer should be determined depending on the receiving material onto which an image is transferred, i.e., on which the adhesive layer is adhered. Suitable adhesive agents for use in the adhesive layer include adhesives and tackifiers.

Specific examples of such adhesives include thermosetting resin adhesives such as epoxy resins, urethane resins, melamine resins, urea resins, phenolic resins, unsaturated polyester resins, furan resins, silicone resins, resorcinol resins, phenol-resorcinol resins, epoxy-phenol resins, and alkyd resins; thermoplastic resin adhesives such as vinyl acetate resins, ethylene-vinyl acetate resins, polyvinyl alcohol resins, acrylic resins, nitrocellulose, asphalt, oleo resins, polyvinyl chloride resins, and polyvinyl butyral resins; elastomer adhesives such as natural rubber, reclaimed rubbers, butadiene-styrene rubbers, butadiene-acrylonitrile rubbers, neoprene rubbers, end silicone rubbers; natural adhesives such as casein, albumin, glue, starches (including processed starches), rosin, shellac, asphalt, and inorganic adhesives, e.g., sodium silicate and litharge glycerin; and mixed adhesives such as phenolic-vinyl butyral resins, phenolic-vinyl formal resins, phenolic-neoprene resins, phenolic-nitrile rubbers, and modified epoxy resins.

Specific examples of the tackifiers include materials which are prepared by adding a tacking auxiliary such as ester gums, hydrogenated rosins, cumarone resins, and phenolic resins, or a plasticizer such as phthalic acid esters, chlorinated paraffin, diphenyl chloride, caster oil, and polyisobutylene, to a main polymer such as natural rubber, SBR (styrene-butadiene rubbers), polyisobutylene, butyl rubbers, acrylic resins, polyvinyl ethers, petroleum resins, terpene resins, polyvinyl butyral resins, and cellulose esters.

The weight of the adhesive layer is from 0.1 $g/m^2$ to 30 $g/m^2$ on a dry basis in viewpoint of adhesive properties and manufacturing costs.

The release layer, adhesive layer, image bearing layer and image supporting layer can be formed by a known method such as coating methods and the like. Coating liquids can be prepared by dissolving or dispersing the materials to be used in a proper solvent. The thus prepared coating liquids are coated on the water-permeable supporter by a known coating machine such as roll coaters, blade coaters, wire bar coaters, air knife coaters, and rod coaters. In addition, hot melt coating can be used in which materials to be coated, which are melted, and coated on the water-permeable supporter by a hot melt coater. Further, laminate coater can also be used in which a film is laminated on a water-permeable supporter by a laminator.

An image can be formed on the image bearing layer of the image transfer sheet of the present invention by a known image forming method. For example, methods such as electrophotography, thermal transfer recording methods using thermofusible inks or sublimation dye inks, ink jet recording methods, printing methods, e.g., offset printing, relief printing, intaglio printing, and stencil printing; electrostatic recording methods, dot impact printing methods, and hand writing can be used.

The images thus formed on the image bearing layer of the image transfer sheet of the present invention is dipped into water to dissolve the release layer, and then the combination layer of the image bearing layer/adhesive layer or the image bearing layer/image supporting layer/adhesive layer is released from the water-permeable supporter while being slid on the surface of the supporter. After being pullout from water, the combination layer is then adhered to the surface of a receiving material such as glass or plastics such that the adhesive layer contacts the surface of the receiving material. The combination layer attached the receiving material is pressed with a spatula and the like, and then dried. Thus, the image can be transferred on the receiving material.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1
Preparation of Release Layer

The following components were mixed to prepare a release layer coating liquid A.

Formulation of Release Layer Coating A

Polyvinyl alcohol modified itaconic acid 20

(KL-504, manufactured by KURARAY Co., Ltd., saponification degree of from 74.0% to 80.0%, polymerization degree of 400)

Water 80

The thus prepared release layer coating liquid A was coated with a wire bar on a paper which was not sized and which had a basis weight of 104 g/m$^2$ and dried to prepare a release layer having a weight of 11 g/m$^2$ on a dry basis.

Preparation of Adhesive Layer

The following components were mixed to prepare an adhesive layer coating liquid A.

Formulation of Adhesive Layer Coating Liquid A

Solution of acrylic copolymer in toluene/hexane 10

(AV-6200- 1, manufactured by Showa Highpolymer Co., Ltd., solid content of 52%)

Toluene 10

The adhesive layer coating liquid A was coated with a wire bar on the above-prepared release layer and dried to form an adhesive layer, whose weight of 8 g/m$^2$ on a dry basis, on the release layer.

Preparation of Image Bearing Layer A

The following components were mixed to prepare an image bearing layer coating liquid A.

Formulation of Image Bearing Layer Coating Liquid A

Acrylic resin emulsion 95

(solid content: 48% glass transition temperature of the acrylic resin: 32.2° C.

composition: BuA/EtA/AN=20/41/39 by weight weight average molecular weight: about 8,000,000)

Toluene 5

The image bearing layer coating liquid A was coated on the above-prepared adhesive layer and dried to form an image bearing layer having a thickness of 20 μm on a dry basis.

Thus, an image transfer sheet (a) was prepared.

The image transfer sheet (a) was cut to prepare a sheet of 300 mm×60 mm. The sheet was dipped into water for 1 minute. A combination layer of the image bearing layer/adhesive layer was released from the water-permeable supporter in water. The combination layer was pulled out of water and set on an acrylic plate, whose surface was preliminary wet with water, such that the image bearing layer contacted the acrylic plate. When the length of the side of the combination layer, whose length was 300 mm (L1) before being dipped in water, was measured, the length was 298 mm (L2). Therefore the ratio L2/L1 was 0.993.

On the other hand, another sheet of the image transfer sheet (a) was set in a color copier (PRETER 550 manufactured by Ricoh Co., Ltd.) to prepare a color image on the image bearing layer. The image was clear, and had image qualities as good as those of the image formed on special paper for the color copier.

When the image transfer street having the image was dipped into water of 20° C. for 1 minute, a combination layer of the image bearing layer/adhesive layer could be easily released from the supporter without troubles such as breaking. When the combination layer, which was pulled out of water, was set on a glass plate such that the adhesive layer contacted the surface of the glass plate, and was pressed with a spatula, the combination layer having the image could be adhered on the glass plate without wrinkles. When the combination layer attached on the glass plate was dried at room temperature, the image bearing layer securely adhered to the glass plate end there were no problems such as breaking and cracking in the transferred image areas. In addition, the transferred image looked natural and noble, and did not look like a label adhered on the glass plate.

Example 2

The procedure for preparation of the image transfer sheet in Example 1 was repeated except that the image bearing layer coating liquid A was replaced with image bearing layer coating liquid B.

Formulation of Image Bearing Layer Coating Liquid B

Acrylic resin emulsion 95

(solid content: 50% glass transition temperature of the acrylic resin: 34.5° C.

composition: BuA/EtA/AN=37/21/42 by weight weight average molecular weight: about 8,000,000)

Toluene 5

Thus, an image transfer sheet (b) was prepared.

The image transfer sheet (b) was cut to prepare a sheet of 300 mm×60 mm. The sheet was dipped into water for 1 minute. A combination layer of the image bearing layer/adhesive layer was released from the water-permeable supporter in water. The combination layer was pulled out of water and set on an acrylic plate, whose surface was preliminary wet with water, such that the image bearing layer contacted the acrylic plate. When the length of the side of the combination layer, whose length was 300 mm (L1) before being dipped in water, was measured, the length was 300 mm (L2). Therefore the ratio L2/L1 was 1.00.

On the other hand, another sheet of the image transfer sheet (b) was set in a color copier (PRETER 550 manufactured by Ricoh Co., Ltd.) to prepare a color image on the image bearing layer. The image was clear, and had image qualities as good as those of the image formed on special paper for the color copier.

When the image transfer sheet having the image was dipped into water of 20° C. for 1 minute, a combination layer of the image bearing layer/adhesive layer could be easily released from the supporter without troubles such as breaking. When the combination layer, which was pulled out of water, was set on a glass plate such that the adhesive layer contacted the surface of the glass plate, and was pressed with a spatula, the combination layer having the image could be adhered on the glass plate without wrinkles. When the combination layer attached on the glass plate was dried at room temperature, the image bearing layer securely adhered to the glass plate end there were no problems such as breaking and cracking in the transferred image areas. In addition, the transferred image looked natural and noble, and did not look like a label adhered on the glass plate.

Example 3

The procedure for preparation of the image transfer street in Example 1 was repeated except that the adhesive layer was not formed.

Thus, an image transfer sheet (c) was prepared.

The image transfer sheet (c) was cut to prepare a sheet of 300 m×60 mm. The sheet was dipped into water for 1 minute. The combination layer of the image bearing layer/adhesive layer was released from the water-permeable supporter in water. The image bearing layer was pulled out of wafer end set on an acrylic plate, whose surface was preliminary wet with water, such that the image bearing layer contacted the acrylic plate. When the length of the side of the combination layer, whose length was 300 m (L1) before being dipped in water, was measured, the length was 298 mm (L2). Therefore the ratio L2/L1 was 0.993.

On the other hand, another sheet of the image transfer sheet (c) was set in a color copier (PRETER 550 manufactured by Ricoh Co., Ltd.) to prepare a color image on the image bearing layer. The image was clear, and had image qualities as good as those of the image formed on special paper for the color copier.

When the image transfer sheet having the image was dipped into water of 20° C. for 1 minute, the image bearing layer could be easily released from the supporter without troubles such as breaking. When the image bearing layer, which was pulled out of water, was set on a glass plate such that the surface of the image bearing layer, on which the image was not formed, contacted the surface of the glass plate, and was pressed with a spatula, the image bearing layer having the image could be adhered on the glass plate without wrinkles. When the image bearing layer attached on the glass plate was dried at room temperature, the image bearing layer adhered to the glass plate and there were no problems such as breaking and cracking in the transferred image areas. In addition, the transferred image looked natural and noble, and did not look like a label adhered on the glass plate.

Example 4

The procedure for preparation of the image transfer street in Example 2 was repeated to prepare an image transfer sheet (b).

The following components were mixed to prepare an image bearing layer coating liquid C.

Formulation of image bearing layer coating liquid C

Solution of acrylic resin in ethyl acetate (solid content: 39% glass transition temperature of the acrylic resin: 75° C.

composition: MMA/MA=75/25 by weight weight average molecular weight: about 60,000)

Ethyl acetate 18

The image bearing layer coating liquid C was coated on the image bearing layer of the image transfer street (b) prepared above, and dried to form an image bearing layer having a weight of 1 g/m² on a dry basis.

Thus, an image transfer sheet (d) was prepared. In the image transfer sheet (d), the image bearing layer of the image transfer sheet (b), i.e., the inner image bearing layer served as an image supporting layer.

The image transfer sheet (d) was cut to prepare a sheet of 300 m×60 mm. The sheet was dipped into water for 1 minute. A combination layer of the image bearing layer/image supporting layer/adhesive layer was released from the water-permeable supporter. The combination layer was pulled out of water and set on an acrylic plate, whose surface was preliminary wet with water, such that the image bearing layer contacted the acrylic plate. When the length of the side of the combination layer, whose length was 300 mm (L1) before being dipped in water, was measured, the length was 300 m (L2). Therefore the ratio L2/L1 was 1.00.

On the other hand, another sheet of the image transfer sheet (d) was set in a color copier (PRETER 550 manufactured by Ricoh Co., Ltd.) to prepare a color image on the image bearing layer. The image was clear, and had image qualities as good as those of the image formed on special paper for the color copier.

When the image transfer sheet having the image was dipped into water of 20° C. for 1 minute, the combination layer of the image bearing layer/image supporting layer/adhesive layer could be easily released from the supporter without troubles such as breaking. When the combination layer, which was pulled out of water, was set on a glass plate such that the adhesive layer contacted the surface of the glass plate, and was pressed with a spatula, the combination layer having the image could be adhered on the glass plate without wrinkles. When the combination layer attached on the glass plate was dried at room temperature, the image bearing layer securely adhered to the glass plate and there were no problems such as breaking and cracking in the transferred image areas. In addition, the transferred image looked natural and noble, and did not look like a label adhered on the glass plate.

Example 5

The procedure for preparation of the image transfer street (a) in Example 1 was repeated.

The image transfer sheet (a) was set in a color thermal transfer printer (MD-1000J manufactured by Alps Electric Co., Ltd.) to prepare an image formed with thermofusible color inks on the image bearing layer. The image was clear, and had image qualities as good as those of the image formed on special paper for the color printer.

When the image transfer sheet having the image was dipped into water of 20° C. for 1 minute, the combination layer of the image bearing layer/adhesive layer was easily released from the supporter without troubles such as breaking. When the combination layer, which was pulled out of water, was set on a glass plate such that the adhesive layer contacted the surface of the glass plate, and was pressed with a spatula, the combination layer having the image could be adhered on the glass plate without wrinkles. When the combination layer attached on the glass plate was dried at room temperature, the image bearing layer securely adhered to the glass plate end there were no problems such as breaking and cracking in the transferred image areas. In addition, the transferred image rooked natural and noble, and did not look like a label adhered on the glass plate.

Comparative Example 1

The procedure for preparation of the image transfer street in Example 1 was repeated except that the image bearing layer coating liquid A was replaced with image bearing layer coating liquid D.

Formulation of Image Bearing Layer Coating Liquid D

Acrylic resin emulsion 95
(solid content: 52% glass transition temperature of the acrylic resin: 26.1° C.
composition: BuA/EtA/AN=22/44/34 by weight
weight average molecular weight: about 8,000,000)
Toluene 5

Thus, an image transfer sheet (b) was prepared.

The image transfer sheet (b) was cut to prepare a sheet of 300 m×60 mm. The sheet was dipped into water for 1 minute. The combination layer of the image bearing layer/adhesive layer was released from the water-permeable supporter in water. The combination layer was pulled out of water and set on an acrylic plate, whose surface was preliminary wet with water, such that the image bearing layer contacted the acrylic plate. When the length of the side of the combination layer, whose length was 300 m (L1) before being dipped in water, was measured, the length was 294 mm (L2). Therefore the ratio L2/L1 was 0.980.

On the other hand, another sheet of the image transfer sheet (b) was set in a color copier (PRETER 550 manufactured by Ricoh Co.,Ltd.)to prepare a color image on the image bearing layer. The image was clear, and had image qualities as good as those of the image formed on special paper for the color copier.

When the image transfer sheet having the image was dipped into water of 20° C. for 1 minute, the combination layer of the image bearing layer/adhesive layer could be easily released from the supporter without troubles such as breaking. When the combination layer, which was pulled out of water, was set on a grass plate such that the adhesive layer contacted the surface of the glass plate and pressed with a spatula, the combination layer having the image could be adhered on the glass plate, however many fine wrinkles were observed in the image area, in particular in the character image area. When the combination layer attached on the glass plate was dried at room temperature, the image bearing layer securely adhered to the glass plate and there were no problems such as breaking, cracking and deformation in the transferred image areas except the wrinkle problem. The transferred image looked natural and noble, and did not look like a label adhered on the glass plate.

This document claims priority and contains subject matter related to Japanese Patent Application No. 10-323205, filed on Nov. 13, 1998, incorporated by reference herein in its entirety.

Having now fully described the invention, it will be apparent to one of ordinary skill in the art that many changes and modifications can be made thereto without departing from the spirit and scope of the invention as set forth therein.

What is claimed as new desired to be secured by Letters Patent of United States is:

1. An image transfer sheet comprising
    a water-permeable supporter;
    a release layer overlying the water-permeable supporter and including a water-soluble release layer resin;
    an image supporting layer including an image supporting layer resin; and
    an image bearing layer overlying the release layer and including an image bearing layer resin,
    wherein a ratio L2/L1 is not less than 0.99, where
        L1 represents a length of one side of the image bearing layer when measured before the image transfer sheet is dipped into water, and
        L2 represents a length of the one side of the image bearing layer when measured after
            dipping the image transfer sheet into water,
            releasing the image bearing layer from the water-permeable supporter, and
            setting the image bearing layer on a wet acrylic plate; and
    wherein the image transfer sheet further comprises an adhesive layer between the release layer and the image supporting layer;
    the image supporting layer is between the adhesive layer and the image bearing layer; and
    the image bearing layer, the image supporting layer and the adhesive layer constitute a combination layer.

2. The image transfer sheet according to claim 1, wherein each of the image supporting layer resin and the image bearing layer resin has a transition temperature not lower than 30° C.

3. The image transfer sheet according to claim 1, wherein the image supporting layer has a thickness of from 5 to 50 μm.

4. The image transfer sheet according to claim 1, wherein each of the image supporting layer resin and the image bearing layer resin comprises a resin selected from the group consisting of polyurethane resins, polyamide resins, polyester resins, polyolefin resins, polystyrene resins, acrylic resins, vinyl resins, ionomer resins, epoxy resins, phenolic resins, polycarbonate resins, polyacetal resins, cellulose resins, melamine resins, fluorine-containing resins, silicone resins, polyether resins, copolymers of these resins, and crosslinked resins of these resins.

5. The image transfer sheet according to claim 1, wherein the image bearing layer resin has a transition temperature not lower than 30° C.

6. The image transfer sheet according to claim 1, wherein the image bearing layer has a thickness of from 5 to 50 μm.

7. The image transfer sheet according to claim 1, wherein the image bearing layer resin comprises a resin selected from the group consisting of polyurethane resins, polyamide resins, polyester resins, polyolefin resins, polystyrene resins, acrylic resins, vinyl resins, ionomer resins, epoxy resins, phenolic resins, polycarbonate resins, polyacetal resins, cellulose resins, melamine resins, fluorine-containing resins, silicone resins, polyether resins, copolymers of these resins, and crosslinked resins of these resins.

8. A method of using an image transfer sheet, the method comprising
    providing the image transfer sheet of claim 1;
    forming an image on the image bearing layer;
    dipping the image transfer sheet in water;
    releasing the image bearing layer with the image from the release layer and the water-permeable supporter;
    adhering the image bearing layer with the image on a receiving material such that a surface of the image bearing layer, on which the image is not formed, contacts the receiving material; and
    drying the image bearing layer with the image.

9. The method according to claim 8, wherein the image comprises an image selected from the group consisting of a toner image formed by electrophotography and an ink image formed by thermal transfer recording.

10. A method of using an image transfer sheet, the method comprising
    providing the image transfer sheet of claim 1;
    forming an image on the image bearing layer;

dipping the image transfer sheet in water;

releasing the image bearing layer with the image from the release layer and the water-permeable supporter;

adhering the image bearing layer with the image on a receiving material such that the adhesive layer contacts the receiving material; and drying the image bearing layer with the image.

11. The image forming method according to claim 10, wherein the image comprises an image selected from the group consisting of a toner image formed by electrophotography and an ink image formed by thermal transfer recording.

12. A method of using an image transfer sheet, the method comprising providing the image transfer sheet of claim 3;

forming an image on the image bearing layer;

dipping the image transfer sheet in water;

releasing the combination layer including the image bearing layer with the image from the release layer and the water-permeable supporter;

adhering the combination layer with the image on a receiving material such that the adhesive layer contacts the receiving material; and drying the combination layer with the image.

13. The image forming method according to claim 12, wherein the image comprises an image selected from the group consisting of a toner image formed by electrophotography and an ink image formed by thermal transfer recording.

14. An image transfer sheet comprising a water-permeable supporter;

a release layer overlying the water-permeable supporter and including a water-soluble release layer resin;

an image supporting layer including image supporting layer resin;

an image bearing layer overlying the image supporting release layer and including an image bearing layer resin; and an image on the image bearing layer, wherein a ratio $L2/L1$ is not less than 0.99, where $L1$ represents a length of one side of the image bearing layer when measured before the image transfer sheet is dipped into water, and $L2$ represents a length of the one side of the image bearing layer when measured after dipping the image transfer sheet into water, releasing the image bearing layer from the water-permeable supporter, and setting the image bearing layer on a wet acrylic plate; and wherein the image transfer sheet further comprises an adhesive layer between the release layer and the image wherein the adhesive layer is between the release layer and the image supporting layer;

the image supporting layer is between the adhesive layer and the image bearing layer; and the image bearing layer, the image supporting layer and the adhesive layer constitute a combination layer.

15. The image transfer sheet according to claim 14, wherein the image on the image bearing layer comprises an image selected from the group consisting of a toner image formed by electrophotography and an ink image formed by thermal transfer recording.

\* \* \* \* \*